(12) United States Patent
Stanze et al.

(10) Patent No.: US 9,414,378 B2
(45) Date of Patent: Aug. 9, 2016

(54) APPARATUS, METHOD AND COMPUTER PROGRAM FOR SCHEDULING DATA TRANSMISSION

(71) Applicant: Alcatel Lucent, Boulogne Billancourt (FR)

(72) Inventors: Oliver Stanze, Stuttgart (DE); Uwe Doetsch, Stuttgart (DE); Mark Doll, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/430,634

(22) PCT Filed: Jul. 25, 2013

(86) PCT No.: PCT/EP2013/065716
§ 371 (c)(1),
(2) Date: Mar. 24, 2015

(87) PCT Pub. No.: WO2014/044449
PCT Pub. Date: Mar. 27, 2014

(65) Prior Publication Data
US 2015/0282163 A1    Oct. 1, 2015

(30) Foreign Application Priority Data
Sep. 24, 2012    (EP) .................................... 12306149

(51) Int. Cl.
*H04W 72/04* (2009.01)
*H04L 1/18* (2006.01)
(Continued)

(52) U.S. Cl.
CPC ........... *H04W 72/0433* (2013.01); *H04L 1/188* (2013.01); *H04L 1/1812* (2013.01);
(Continued)

(58) Field of Classification Search
None
See application file for complete search history.

(56) References Cited

U.S. PATENT DOCUMENTS

2009/0279480 A1    11/2009    Rosenqvist et al.
2009/0307554 A1*   12/2009    Marinier ............... H04L 1/1812
                                                              714/748

(Continued)

FOREIGN PATENT DOCUMENTS

EP    1 289 219 A1    3/2003
JP    2011-010041 A    1/2011
(Continued)

OTHER PUBLICATIONS

Stefan Brueck et al., "Centralized Scheduling for Joint Transmission Coordinated Multi-Point in LTE-Advanced," 2010 International ITG Workshop on Smart Antennas (WSA 2010), pp. 177-184, XP031663710, 2010.

(Continued)

*Primary Examiner* — Hassan Kizou
*Assistant Examiner* — Hashim Bhatti
(74) *Attorney, Agent, or Firm* — Fay Sharpe, LLP (57) ABSTRACT

Embodiments provide an apparatus, a method and a computer program for scheduling a data transmission. The apparatus 10 is operable for scheduling data transmissions to a mobile transceiver in a mobile communication system. The apparatus 10 comprises means for determining 12 a delay between a transmission of a first data packet and a transmission of a next data packet to the mobile transceiver, the delay depending on an acknowledgement packet received from the mobile transceiver for the first data packet. The apparatus 10 further comprises means for scheduling 14 data transmissions to the mobile transceiver based on the delay.

14 Claims, 6 Drawing Sheets

(51) Int. Cl.
*H04W 72/12* (2009.01)
*H04L 12/841* (2013.01)
*H04L 5/00* (2006.01)
*H04W 28/16* (2009.01)

(52) U.S. Cl.
CPC ............ *H04L1/1822* (2013.01); *H04L 1/1887* (2013.01); *H04L 5/0035* (2013.01); *H04L 5/0078* (2013.01); *H04L 47/283* (2013.01); *H04W 28/16* (2013.01); *H04W 72/12* (2013.01)

(56) References Cited

U.S. PATENT DOCUMENTS

| | | | |
|---|---|---|---|
| 2010/0202302 A1* | 8/2010 | Cai | H04L 1/1822 370/252 |
| 2012/0033588 A1* | 2/2012 | Chung | H04L 1/1812 370/280 |
| 2013/0077543 A1* | 3/2013 | Kim | H04B 7/15507 370/281 |
| 2015/0110027 A1* | 4/2015 | Lim | H04L 1/1812 370/329 |

FOREIGN PATENT DOCUMENTS

| | | |
|---|---|---|
| JP | 2012-531171 A | 12/2012 |
| JP | 2013-509825 A | 3/2013 |
| KR | 10-2009-0057228 A | 6/2009 |
| KR | 10-2010-0065460 A | 6/2010 |
| WO | 2010/151550 A1 | 12/2010 |
| WO | 2011/053784 A1 | 5/2011 |

OTHER PUBLICATIONS

Peter Kela et al., "Dynamic Packet Scheduling Performance in UTRA Long Term Evolution Downlink," 3$^{rd}$ International Symposium on Wireless Pervasive Computing, IEEE, pp. 308-313, XP031281251, 2008.

Zvi Rosberg et al., "A network rate management protocol with TCP congestion control and fairness to all," Computer Networks, 54, pp. 1358-1374, 2010.

International Search Report for PCT/EP2013/065716 dated Sep. 11, 2013.

* cited by examiner

APPARATUS, METHOD AND COMPUTER PROGRAM FOR SCHEDULING DATA TRANSMISSION

Embodiments of the present invention relate to data transmission, more particularly but not exclusively to scheduling data transmission in wireless communications.

BACKGROUND

Demands for higher data rates for mobile services are steadily increasing. At the same time modern mobile communication systems as 3rd Generation systems (3G) and 4th Generation systems (4G) provide enhanced technologies, which enable higher spectral efficiencies and allow for higher data rates and cell capacities. As operators are seeking to extend the coverage and capacity of their networks advanced transmission concepts are one way forward.

Conventional mobile communication systems make use of circuit switched and packet switched data. While for circuit switched data transmission radio resources are permanently reserved in a connection oriented manner, packet data transmission makes use of scheduling, i.e. radio resources are assigned non-permanently in a connection less manner. The procedure of assigning radio resources to certain users for packet data transmission is also referred to as scheduling. The entity carrying out scheduling is also called a scheduler. Architectures of mobile communication systems tend to be more and more centralized. In other words, more and more intelligence of the mobile communication network is concentrated centralized entities and transmission points, where transmission and reception of wireless signals is carried out, become more and more lean. This kind of architecture is, for example, motivated by savings, which can be obtained at the transmission points. Since a large number of transmission points is used for a mobile communication system they may be kept as inexpensive as possible. Moreover, the efficiency of processing resources can be increased, when the processing resources are concentrated at central nodes in the network.

While processing resources are also needed for schedulers, there is a motivation to also move the schedulers to central points of the mobile communication systems. On the other hand, schedulers take into account radio conditions of mobile transceivers in the mobile communication system, which change rapidly. Therefore, there is another tendency to move the schedulers as close as possible to the wireless interface, in order to be able to quickly react to the rapidly changing conditions on the wireless interface. The farther the scheduler moves away from the wireless interface, the longer the delay for scheduling. Another point is the delay on feedback loops with a mobile transceiver, when automatic retransmission is used. In automatic retransmission transmissions are acknowledged or dis-acknowledged by respective acknowledgement packets and automatically retransmitted in case of dis-acknowledgements. The farther away the scheduler from the wireless interface, the longer the delay until such an acknowledgement packet can be received.

Stefan Brueck et al disclose in "Centralized Scheduling for Joint Transmission Coordinated Multi-Point in LTE-Advanced" a consideration of coordinated multi-point transmission/reception for LTE-Advanced as a tool to improve the coverage of high data rates, the cell-edge throughput and/or to increase the system throughput. Joint transmission schemes are an example of coordinated transmission between cells for the downlink. Here, data are transmitted simultaneously either coherently or non-coherently from multiple cells to a single mobile station. In this paper, a centralized MAC scheduling approach for joint transmission coordinated multi-point (JT CoMP) is proposed. Since several base stations transmit jointly to a single mobile station, the base stations are grouped together in so-called clusters. Several cluster strategies are investigated as well. The focus is on schemes that add only low complexity to the existing 3GPP LTE Release 8 system. Simulation results are provided for non-coherent transmission for full buffer and bursty traffic models with various system loads for different static cell clustering approaches.

Document EP 1 289 219 A1 discloses a method of scheduling data packets for transmission from a first terminal to a second terminal over a channel shared with other terminals comprising monitoring a time interval from accepting a packet for transmission and scheduling the packet for transmission. If the transmission is unsuccessful, the packet is scheduled for retransmission within a predetermined time. The predetermined time is selected dependent upon the time interval.

Document US 2009/279480 A1 discloses a method of scheduling transmissions for a base station in a multi-carrier wireless communication network which comprises scheduling initial transmissions of data packets for one or more users on a first carrier, without reserving scheduling capacity on the first carrier for retransmissions. Doing so increases the scheduled capacity of the first carrier for initial transmissions. The method further includes scheduling retransmissions, as needed, for given ones of the data packets on one or more second carriers. The method allows more traffic to be scheduled on the first carrier, meaning that multi-carrier transmissions are less frequently needed to convey all of the traffic targeted to one or more receivers. Those receivers therefore spend more time operating with a reduced receiver bandwidth (as compared to the bandwidth required for receiving more than one carrier), which reduces operating power.

SUMMARY

Embodiments are based on the finding that some advantages can be obtained when an architecture of a mobile communication system is centralized. That is to say that some essential functionality of, for example, base station transceivers, can be centralized, while the base station transceivers may communicate with each other. It is another finding that split architecture, where the central component communicates with a remote component, also has advantages. Some parts of a base station may then be located at the central component while others are located at the remote component closer to the antenna. In such an architecture multiple base station transceivers may relocate parts of their functionality to the same central component. One advantage of having a central component may be that advanced cooperation schemes, for example, schemes that involve multiple transmission points such as Cooperative Multi Point transmission (CoMP), may be enabled easier. Moreover, the OPerational EXpenditures (OPEX) may be reduced. It is another finding that split architectures may have a draw back in that additional delay may be introduced for data transmissions between the remote component and the central component.

Embodiments therefore provide an apparatus for scheduling data transmissions to a mobile transceiver in a mobile communication system. That is to say that the apparatus may be comprised or included in a base station transceiver of a mobile communication system. In other embodiments said apparatus may be comprised in a centralized component or a remote component of a mobile communication system.

In some embodiments the apparatus may be comprised in a wireless or mobile communication system. The mobile communication system may, for example, correspond to one of the mobile communication systems standardized by the $3^{rd}$ Generation Partnership Project (3GPP), as Global System for Mobile Communications (GSM), Enhanced Data rates for GSM Evolution (EDGE), GSM EDGE Radio Access Network (GERAN), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. In the following the terms mobile communication system and mobile communication network are used synonymously.

The mobile communication system may comprise a plurality of transmission points or base station transceivers operable to communicate radio signals with a mobile transceiver. In embodiments, the mobile communication system may comprise mobile transceivers and base station transceivers. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) or user in line with the 3GPP terminology. A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc.

The mobile communication system may thus be cellular. The term cell refers to a coverage area of radio services provided by a transmission point, a base station transceiver or a NodeB, an eNodeB, respectively. In some embodiments a cell may correspond to a sector. For example, sectors can be achieved using sector antennas, which provide a characteristic for covering an angular section around a base station transceiver. In some embodiments, a base station transceiver may, for example, operate three or six cells covering sectors of 120° (in case of three cells), 60° (in case of six cells) respectively. A mobile transceiver can be registered or associated with a cell, i.e. it can be associated to a cell such that data can be exchanged between the network and the mobile in the coverage area of the associated cell using a dedicated channel, link or connection.

The apparatus further comprises means for determining a delay between a transmission of a first data packet and a transmission of a next data packet to the mobile transceiver, the delay depending on an acknowledgement packet received from the mobile transceiver for the first data packet. The means for determining may correspond to determiner. In some embodiments the means for determining may correspond to a processing component on which according software is executed. For example, the means for determining can be implemented on a Digital Signal Processor (DSP) on which according software is executed. The delay between the transmission of the data packet to the mobile transceiver and the reception of the acknowledgement packet received from the mobile transceiver may be determined by means of measuring. In other words, the means for determining can be operable to measure the delay. In other embodiments, the delay may be stored in and read from a memory and hence, it may be predetermined. For example, such a delay may be manually adjusted, for example, by means of Operation and Maintenance (O&M) efforts.

In other words, the apparatus determines the delay between a transmission of the data packet, for which the reception of the acknowledgement packet is awaited, and the transmission of the next data packet. The apparatus may be located somewhere in the network. For example, the apparatus may be located close to a transmission or reception antenna, for example, directly at the transmission point. In other embodiments the apparatus may be located in a central component, for example, in a component, where a plurality of processes or processing resources are centralized. Therefore, embodiments may provide the advantage, that the delay may be considered individually, depending on the capabilities of the mobile transceiver and the location of the apparatus within the mobile communication system.

The delay itself can be considered as a RoundTrip Time (RTT). The RTT can be the time between when a data packet is scheduled, i.e. transmitted, to the mobile transceiver, until the mobile transceiver has acknowledged or dis-acknowledged the reception of said data packet and the next data packet can be transmitted. The acknowledgement or dis-acknowledgement can be carried out using an acknowledgement packet, which is transmitted from the mobile transceiver back to a transmission point or back to the apparatus for scheduling. Moreover, the apparatus for scheduling comprises means for scheduling data transmissions to the mobile transceiver based on the delay. In other words, the apparatus may take into account the above delay. Therefore, when the mobile transceiver has limited capabilities, the delay can be taken into account for the scheduling, and no further data transmissions may be scheduled when the mobile transceiver has reached its capabilities.

In embodiments the data transmissions can be organized in repetitive transmission intervals. Such transmission intervals may correspond to radio frames, sub-frames, Time Transmission Intervals (TTIs), slots, etc. In some embodiments the delay may be determined by means of a number of such transmission intervals. For example, the delay may be determined as a number of radio frames, sub-frames, time transmission intervals, etc.

In some embodiments, it may be known that the delay corresponds to a number of transmission intervals. If capabilities of the mobile transceiver are limited, for example the capabilities to receive or process transmissions and retransmissions, the delay may be critical for the overall performance of the mobile communication system. For example, when the mobile transceiver uses up his processing capabilities within the delay period, scheduling of further data transmissions to said mobile transceiver may not be carried out as the mobile receiver won't be able to process any additional transmissions of scheduled data. Embodiments may therefore provide the advantage that the scheduler can take into account limited capabilities of the mobile transceiver as well as the delay and may therefore enable a more efficient use of radio resources. Inefficient use of radio sources may occur, when a mobile transceiver is scheduled although it does not have the processing capabilities for said transmission or it may also occur when the processing capabilities of UEs are used up, although further radio resources are available. In other words embodiments may provide the advantage that a higher efficiency of the utilization of radio resources within a mobile communication system can be achieved.

In some embodiments the means for determining can be operable to determine a transmission cycle capacity of the mobile transceiver. The transmission cycle capacity may correspond to a maximum number of data transmissions for which no acknowledgement packet has been received. In other words, the mobile transceiver may respond to each data transmission with an acknowledgement data packet, which may comprise a positive acknowledgement or a negative acknowledgement (dis-acknowledgement). Depending on the location of the apparatus within the mobile communication system and depending on the processing speed of the mobile communication system, the transmission cycle capacity may be less than the maximum number of transmissions that would be possible within the delay period.

For example, if a mobile transceiver has a transmission cycle capacity of two, four, eight, twelve, sixteen, etc. transmissions at a time, then that number would determine the number of subsequent payload data transmissions from the means for scheduling before an acknowledgement packet is received from the UE, which would set transmission resources free again. Such a transmission cycle resource or transmission resource may also be referred to as a transmission process. A transmission process may then include an actual transmission of a payload data packet to the mobile transceiver and a reception of the corresponding acknowledgement packet. In other words, a transmission process will be occupied from the time a data packet is transmitted to the mobile transceiver until an acknowledgement data packet is received for said data packet from said mobile transceiver. Moreover, the number of processes may be limited for the mobile transceiver, which is due to limited processing resources at the mobile transceiver. As for each payload data packet, which is scheduled by the apparatus, another transmission process is used up or utilized at the mobile transceiver, the mobile transceiver may run out of transmission processes within the delay period. If this happens no more data can be transmitted or scheduled to said mobile transceiver. Therefore the means for scheduling can be operable to further base data transmissions to the mobile transceiver on the transmission cycle capacity of the mobile transceiver. Embodiments may provide the advantage that transmission gaps can be avoided by taking into accounted transmission cycle capacity into scheduling decisions.

In further embodiments the means for scheduling can be operable to schedule data transmissions to a plurality of mobile transceivers. In other words, the radio resources, which are assigned for data transmission to the mobile transceivers can be shared between the plurality of mobile transceivers, each having a transmission cycle capacity. The means for scheduling can be operable to further base the scheduling of data transmissions on a number of mobile transceivers being scheduled for data transmission. Therefore, the radio resources can be shared or scheduled between the number of mobile transceivers being scheduled for data transmission taking into account their individual transmission cycle capacities. Embodiments may therefore provide the advantage that a more efficient use of the radio resources can be achieved.

The means for scheduling can be further operable to schedule data transmissions based on a scheduling metric. In embodiments the scheduling metric can be determined per mobile transceiver to be scheduled. For example, the scheduling metric can be a proportional fair scheduling metric. The means for scheduling can then be operable to determine a mobile transceiver to be scheduled based on the scheduling metric until the transmission cycle capacity of the determined mobile transceiver is reached. The means for scheduling can be further operable to determine a different mobile transceiver when the transmission cycle capacity of the mobile transceiver, which is determined based on the scheduling metric, is reached. In other words, a scheduling metric may be determined per mobile transceiver. In line with conventional concepts, the scheduling metric may determine an order of the mobile transceivers in which they are scheduled, i.e. in which they are assigned radio resources for data transmission. In embodiments the scheduler may take into account the transmission cycle capacity of the mobile transceiver in addition to the scheduling metric. In other words, although a mobile transceiver may have the highest priority according to the scheduling metric, the scheduler of the embodiment may not schedule said mobile transceiver when its transmission cycle capacity is reached. In the embodiments the scheduler or the means for scheduling may then rather schedule the mobile transceiver with the second highest priority. Again, embodiments may provide the advantage that a more efficient use of the radio resources is made.

In embodiments the acknowledgement packet may comprise a positive or negative acknowledgement on a reception of the data packet at the mobile transceiver. The acknowledgement data packet may terminate a transmission process, at least for as long as it is positive. A positive acknowledgement allows the process to be reused for transmission of new data. If a negative acknowledgement is achieved, the process may still be occupied with a retransmission of the same data. If a retransmission occurs, the process may be blocked for another delay period, until the acknowledgement packet on the retransmission is received. The means for scheduling can be operable to take into account the status of the transmission processes at a mobile transceiver. The means for scheduling can be further operable to base data transmissions to the mobile transceiver on a proportional fair scheduling metric. The proportional fair scheduling metric may take into account the channel capacity or radio channel quality of the radio channel between the transmission point of the data transmission and the mobile transceiver.

In other words, independent from the location of the apparatus for scheduling, at some point a wireless transmission is carried out from a transmission point to the mobile transceiver. In between there is the channel with numerous effects and propagation properties, which leads to the well-known radio channel. The quality of said channel may be determined by an according quality measure. The quality measure may take into account attenuation, fading conditions, interference, reception power, etc. at the mobile transceiver. One quality measure is the Channel State Information (CSI) provided from the mobile transceiver to the transmission point or even the scheduler. Furthermore, the proportional fair scheduling metric may take into account an average data rate the mobile transceiver received during a time interval in the past. The time interval can extend across multiple radio frames, subframes, TTIs, etc. In other words, the proportional fair scheduler takes into account the channel quality of a mobile transceiver and the average data rate the mobile transceiver achieved during a certain time interval.

In embodiments the means for scheduling can be operable to schedule data transmissions to a plurality of mobile transceivers and to further base the scheduling of data transmissions on a number of mobile transceivers being scheduled for data transmission. In other words, while there may be a plurality of mobile transceivers available for scheduling, the number of mobile transceivers being scheduled simultaneously may be limited. The scheduler may take into account the number of mobile transceivers which can be simultaneously scheduled.

In further embodiments the means for scheduling can be operable to determine an average number of mobile transceivers to be scheduled per transmission interval from a plurality of mobile transceivers. The average number of mobile transceivers can be based on the delay and the transmission cycle capacity. In other words, once the delay and once the transmission cycle capacity are known, for example in terms of maximum number of transmission processes, an average number of mobile transceivers, which can be active per transmission interval in order to make best use of it, can be determined. Having determined such an average number of mobiles to be scheduled per transmission interval, the scheduler can take such a number into account. For example, the average number of mobile transceivers per transmission interval corresponds to two, then in one transmission interval a single mobile transceiver may be scheduled while in a subsequent transmission interval three mobile transceivers may be scheduled such that the average number of mobile transceivers per transmission interval is equal to two.

The means for scheduling can be operable to schedule multiple mobile transceivers in the time transmission intervals of a delay period. The delay period may correspond to a sequence of transmission intervals having at least the duration of the delay. In some embodiments the mobile transceivers can be scheduled such that an average number of mobile transceivers scheduled in a transmission interval of the delay period is equal or lower than the average number of mobile transceivers to be scheduled per transmission interval.

In further embodiments the means for scheduling can be operable to determine a counter per transmission interval. The counter can be based on the delay period, the number of mobile transceivers to be scheduled, and/or the transmission cycle capacity in terms of transmission intervals. The means for scheduling can be operable to base the scheduling of the mobile transceivers on the counter. In other words the counter can be measured or monitored to keep track that no mobile transceiver is scheduled during more transmission intervals during its delay period than represented by its transmission cycle capacity. Embodiments may therewith provide the advantage that transmission gaps can be reduced or even avoided.

In embodiments the counter can be further based on a number of mobile transceivers having been scheduled in a previous transmission interval. Furthermore, the counter can be further based on a number of mobile transceivers having been scheduled in a transmission interval a delay period before a current transmission interval. In embodiments, all kinds of constellations and transmissions of different mobile transceivers can be taken into account in order to determine a measure based on which exceedance of the transmission cycle capacity of the individual mobile transceivers can be reduced or even avoided.

Embodiments further provide a method for scheduling a data transmission to a mobile transceiver in a mobile communication system. The method comprises determining a delay between a transmission of a first data packet and a transmission of a next data packet to the mobile transceiver, the delay depending on an acknowledgement packet received from the mobile transceiver for the first data packet. The method further comprises scheduling data transmission to the mobile transceiver based on the delay.

Moreover, embodiments provide a computer program having a program code for performing one of the above described methods, when the computer program is executed on a computer or processor.

Embodiments may provide the advantage that schedulers or scheduling decisions may be optimized or improved taking into account split architectures. As a delay of a certain mobile is determined, it can be taken into account and scheduling decisions can be based on the delay. Therewith, the scheduler can plan ahead and assign one or more mobile transceivers to the respective radio resources. In other words, in embodiments a scheduler may foresee that the transmission cycle capacity of a certain mobile transceiver may be exhausted. The scheduler may then rather schedule said mobile transceiver using large data packets, i.e. in terms of more radio resources use at a time, in a single process rather than scheduling multiple smaller data packets, assuming the mobile transceiver has an according priority based on the scheduling metric. In other words the scheduler determines which mobile transceiver should be scheduled while taking into account the limitations of the mobile transceiver. Moreover, in embodiments schedulers may still achieve frequency diversity, as the radio channels for the mobile transceivers in the frequency domain can still be taken into account and according advantages radio resources may still be assigned to said mobile transceivers. Overall, embodiments may achieve a higher or improved efficiency of the system performance of the mobile communication system.

BRIEF DESCRIPTION OF THE FIGURES

Some other features or aspects will be described using the following non-limiting embodiments of apparatuses and/or methods and/or computer programs by way of example only, and with reference to the accompanying Figures, in which.

DESCRIPTION OF SOME EMBODIMENTS

Various embodiments will now be described in more detail with reference to the accompanying drawings. In the figures, the thicknesses of lines, layers and/or regions may be exaggerated for clarity.

Accordingly, while embodiments are capable of various modifications and alternative forms, embodiments thereof are shown by way of example in the figures and will herein be described in detail. It should be understood, however, that there is no intent to limit embodiments to the particular forms disclosed, but on the contrary, embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description some components will be displayed in multiple figures carrying the same reference signs, but may not be described multiple times in detail. A detailed description of a component may then apply to that component for all its occurrences.

Figure 1:
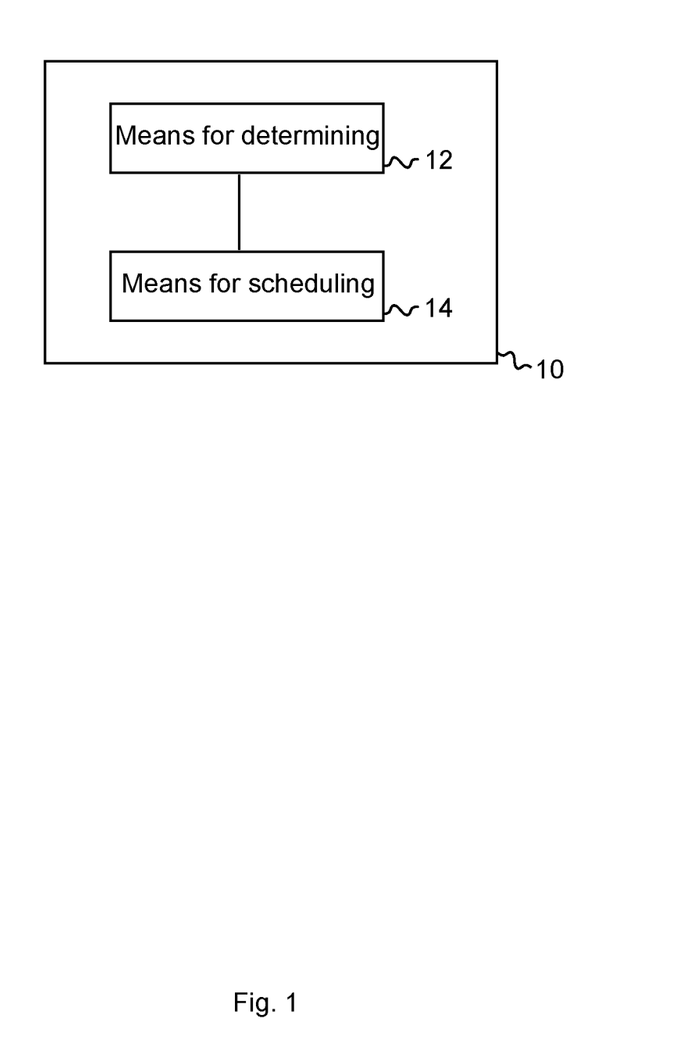
FIG. 1 illustrates an embodiment of a scheduling apparatus.

FIG. 1 shows an embodiment of a scheduling apparatus 10. The apparatus is operable for scheduling data transmissions to a mobile transceiver in a mobile communication system. The apparatus 10 comprises means for determining 12 a delay between a transmission of a first data packet and a transmission of a next data packet to the mobile transceiver, the delay depending on an acknowledgement packet received from the mobile transceiver for the first data packet. The scheduling apparatus 10 further comprises means for scheduling 14 data transmissions to the mobile transceiver based on the delay. The means for determining 12 is coupled with the means for scheduling 14.

Figure 2:
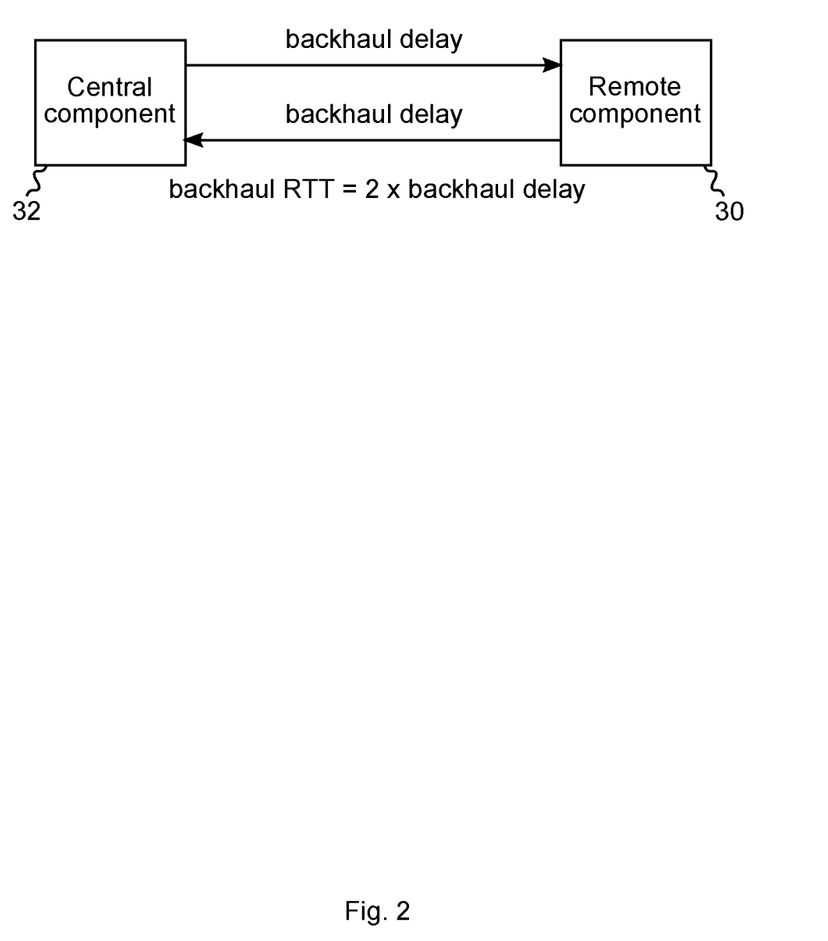
FIG. 2 illustrates a block diagram of an architecture in an embodiment.

In the following the mobile communication system is assumed to be an LTE system. LTE is mainly based on a decentralized architecture. Most of the functionality is located in the base station transceiver, i.e. in the eNodeB (eNB). The eNBs can communicate via an X2-interface (inter eNB communication) with each other. FIG. 2 illustrates a block diagram of an architecture in an embodiment. FIG. 2 illustrates a remote component 30 in the LTE system, which is located separately from a central component 32. The remote component 30 and the central component 32 are coupled through a backhaul network, which introduces a backhaul delay in both directions, i.e. for data transmissions from the remote component 30 to the central component 32 and vice versa. As such, the Round Trip Time (RTT) corresponds to the doubled backhaul one-way delay. This is also shown in FIG. 2. FIG. 2 illustrates the so-called split architecture. Thereby parts of the eNB functionality are located at the central component 32 while the remaining eNB functionality is located at the remote component 30 close to the antenna. Multiple eNBs may relocate parts of their functionality to the same central component 32. The advantage of having a central component 32 is that it easily enables advanced cooperation schemes in the uplink (UL) and in the downlink (DL) such as, for example, Cooperative MultiPoint transmission (CoMP). Moreover the OPEX may be reduced. A draw back of a split architecture is that additional delay is introduced, which may impact the LTE protocols.

For example, LTE assumes 8 ms Hybrid Automatic Retransmission reQuest (HARQ) loop delay. This loop delay corresponds to the time between scheduling a first data packet and scheduling either a next data packet or a retransmission of the first data packet, depending on whether in the meantime a positive acknowledgement (ACK) or negative acknowledgement (NACK), respectively, feedback for the first data packet has been received at the scheduler apparatus 10. For example, from the scheduler's 10 perspective, the acknowledgment may be available 7 ms after a transmission and another 1 ms may be necessary for scheduling summing up to an overall loop delay of 8 ms. That is to say 8 HARQ processes are sufficient to enable a mobile transceiver to be scheduled in each sub-frame. Therefore in LTE releases 8/9/10 8 HARQ processes are defined per mobile transceiver. In case of a split architecture additional delay between the scheduler and the mobile may be introduced. In other words it may take more than 8 ms for the scheduler to receive an ACK/NACK and schedule the next (re-)transmission. This may lead to a situation, in which it would beneficial in terms of system performance to schedule the mobile transceiver but it may not be possible anymore because all 8 HARQ processes of the corresponding mobile are blocked, i.e. HARQ ACK/NACK are not yet received.

Figure 3:
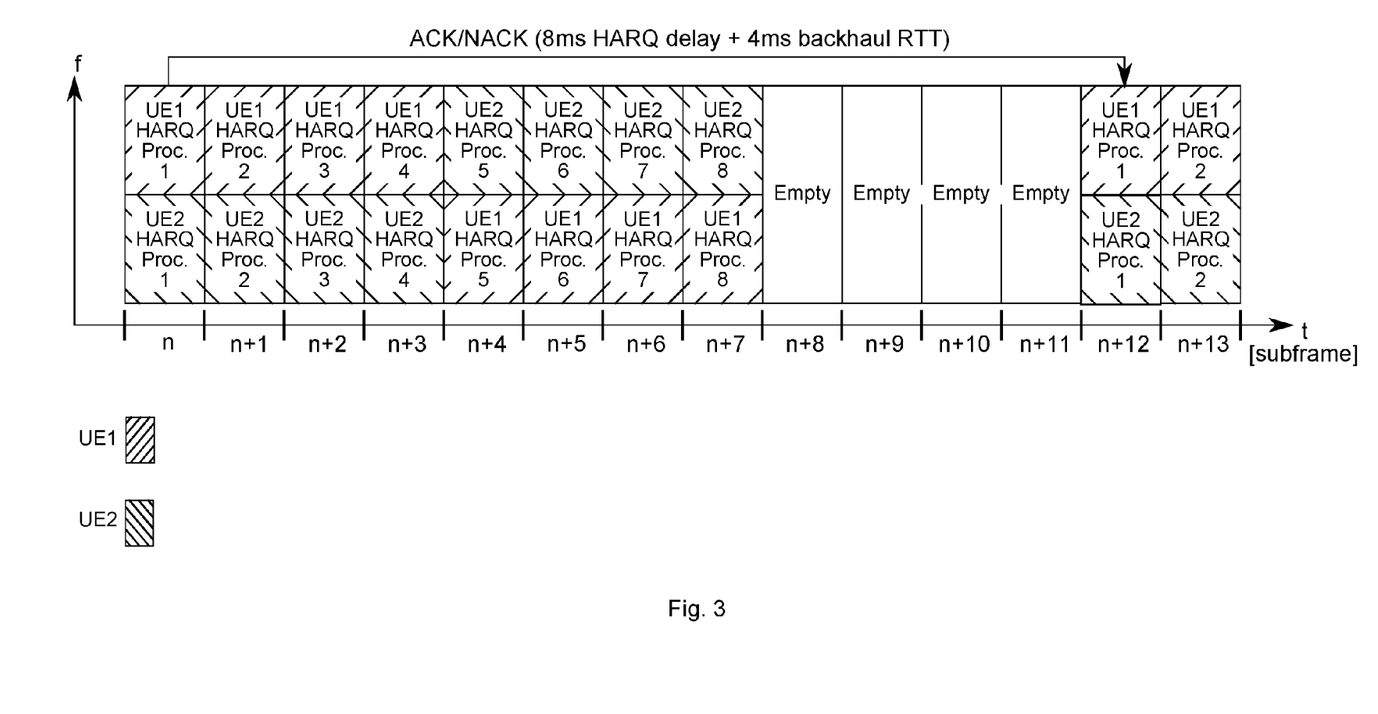
FIG. 3 shows a sequence of sub-frames illustrating a transmission cycle capacity of a mobile transceiver in an embodiment.

Furthermore, Frequency Domain Proportional Fair Scheduling (FDPFS) is a scheduling technique, which is used in an LTE system. FDPFS may result in a high system performance due to the exploitation of frequency diversity gains. The FDPFS does not address the problem of blocked HARQ processes due to the additional backhaul delay, a scheduling decision may only be based on the (previous) mobile throughput and the reported Channel Quality Indicators (CQI) for the different resources. Therefore a situation may arise as it is illustrated in FIG. 3. FIG. 3 shows a sequence of sub-frames illustrating a transmission cycle capacity of a mobile transceiver in an embodiment.

As FIG. 3 illustrates data transmissions are organized in repetitive transmission intervals, which are also referred to as sub-frames. The delay is determined in a number of transmission intervals or sub-frames in the present embodiment. FIG. 3 illustrates a view chart showing time t in terms of sub-frames to the right and frequency to the top. The sequence of sub-frames starts at an arbitrary sub-frame n and extends to sub-frame n+13. Moreover the delay is indicated being comprised of 8 ms HARQ delay plus 4 ms backhaul RTT, i.e. adding up to 12 ms. Moreover, it is assumed that the duration of one sub-frame also corresponds to 1 ms. As indicated in FIG. 3 the delay extends across 12 ms. Moreover, there are two mobile transceivers, which are also referred to as user equipment 1 (UE1) and user equipment 2 (UE2). The sub-frames in which the UE 1 and UE 2 are scheduled are indicated using different hachures in the following figures. As FIG. 3 shows the two active users UE1 and UE2 are both scheduled in the sub-frames n to n+7 on their respective best resources. Both UEs have a transmission cycle capacity of 8 processes, which are indicated by the corresponding numbers in the sub-frames.

It is to be noted that LTE downlink resource allocations are not required to be contiguous, but due to simplicity reasons FIG. 3 shows contiguous allocation for each of the UEs. As both of the UEs are assumed to be limited with respect to the number HARQ processes, i.e. they are limited to 8 HARQ processes, both UEs run out of unblocked HARQ processes after the first 8 sub-frames. Hence, in sub-frames n+8 ... n+13 no transmissions can be scheduled, because the mobiles cannot be scheduled before an ACK/NACK is received in the sub-frames n+12.

In conventional systems the unused resources in the sub-frames n+8, ..., n+11 may lead to a reduced or suboptimal system performance. Therefore, embodiments may consider the delay of the mobile transceivers. In other words, the means for determining 12, see FIG. 1, is operable to determine a transmission cycle capacity of the mobile transceiver. The transmission cycle capacity corresponds to a maximum number of data transmissions for which no acknowledgement packet has been received. In other words, the transmission cycle capacity corresponds to 8 HARQ processes in the embodiment depicted in FIG. 3. Moreover, the means for scheduling 14 is operable to further base data transmissions to the mobile transceiver on the transmission cycle capacity of the mobile transceiver, which will be detailed in the following.

Embodiments may use FDPFS and they may consider the potential blocking of HARQ processes, for example, by scheduling only a single mobile in certain sub-frames, potentially also with a higher data rate or a larger payload data packet. The unused resources may then be reduced or even avoided and the system performance may be increased. The described problem of the unused resources due to blocked HARQ processes may decrease with the number of mobiles, which can be scheduled and it may increase with the backhaul RTT.

That is to say the means for scheduling 14 is operable to schedule data transmissions to a plurality of mobile transceivers UE1, UE2. The means for scheduling 14 is operable to further base the scheduling of data transmissions on a number of mobile transceivers being scheduled for data transmission. In other words, the means for scheduling 14 may consider both UEs UE1 and UE2.

In the following embodiment the means for scheduling 14 is further operable to schedule data transmissions based on a scheduling metric. The scheduling metric corresponds to the frequency domain proportional fair scheduling metric, as introduced above. The scheduling metric is determined per mobile transceiver to be scheduled, i.e. for UE1 and for UE2. The means for scheduling 14 is further operable to determine a mobile transceiver to be scheduled based on the scheduling metric until the transmission cycle capacity of the mobile transceiver is reached. In other words, coming back to the above embodiment, when the scheduling metric prioritizes a UE for being scheduled but the 8 HARQ processes are already used up, the UE would not be considered by the scheduler, but another UE. The means for scheduling 14 is operable to determine a different mobile transceiver for being scheduled when the transmission cycle capacity of the mobile transceiver is reached. That is to say that the scheduler 14 plans ahead in order to reduce or avoid empty transmission sub-frames as they are shown in FIG. 3.

Moreover, embodiments may consider an increase in the number of HARQ processes. The number of HARQ processes may not only reflect the HARQ delay but also the additional backhaul RTT. If, for example, in the example in FIG. 3 the number of HARQ processes would be increased from 8 to 12 the described problem of blocked HARQ processes would not exist in this scenario. Such an embodiment would have a drawback that it may be restricted to future LTE releases, because LTE releases 8/9/10 restrict a number of HARQ processes to 8. Other embodiments may use other scheduling metrics. For example, an embodiment may use a Round Robin scheduler instead of a proportional fair scheduler. A Round Robin scheduler may schedule, depending on the implementation, only a single mobile per sub-frame, i.e. all available transmission resources are assigned to the corresponding mobile transceiver. When scheduling one mobile after the other there may not be any unused resources for as long as the sum of the HARQ processes of all mobiles is higher than the sum of HARQ delay and backhaul RTT. Such embodiments may have the draw back that the Round Robin scheduler may not exploit frequency diversity, which may lead to a suboptimal or reduced performance for low mobility scenarios.

Embodiments may provide the advantage that a proportional fair scheduler, such as the above described FDPFS, may be extended so to consider the risk of unused resources due blocked HARQ processes in case of additional backhaul delay. On one side embodiments may provide extended scheduler targets to avoid unused blocked HARQ processes and on the other they may still exploit frequency diversity as much as possible. In embodiments this can be realized by dynamically controlling the number of allocations in each sub-frame, such that unused sub-frames due to blocked HARQ processes are avoided.

In the following more detailed embodiments will be described. These embodiments use an acknowledgement data packet, which comprises a positive (ACK) or a negative (NACK) acknowledgement, which is transmitted by the mobile transceiver upon reception of a data packet. In line with what was described above the means for scheduling 14 is further operable to base data transmissions to the mobile transceiver on a proportional fair scheduling metric. The proportional fair scheduling metric takes into account the channel capacity or quality of the radio channel between the transmission point, for example, an eNB, of the data transmission and the mobile transceiver. The proportional fair scheduling metric may further take into account the average data rate the mobile transceiver received during a certain time interval in the past, for example, during a number of previous sub-frames.

The means for scheduling 14 is operable to schedule data transmissions to a plurality of mobile transceivers (UE1 and UE2). Moreover the means for scheduling 14 is operable to further base the scheduling of data transmissions on the number of mobile transceivers being scheduled for data transmission.

In the following embodiment the means for scheduling 14 considers the HARQ status in a scheduling decision. The scheduler 14 determines the information regarding the backhaul delay/RTT. This information may, for example, be configured as part of Operation and Maintenance (O&M), i.e. it may be determined from a memory where it was stored before. In other embodiments the information on the backhaul delay may be determined by the scheduler 14 by measuring the differences of the HARQ loop delay defined by the LTE standard, i.e. 8 ms, and the effective loop delay between sending a packet to a mobile via receiving the corresponding HARQ ACK/NACK and sending a (re-)transmission accordingly. Based on this information effective HARQ RTT=HARQ delay+backhaul RTT can be determined.

Additionally, the scheduler 14 knows the current number of active mobiles (numActiveMobiles). Based on this information the scheduler 14 can calculate the number of mobiles, which can be scheduled per sub-frame without risking blocked HARQ processes (numMobilesPerSubframe):

numMobilesPerSubframe=numActiveMobiles*
numHARQProcessesPerMobile/HARQ RTT.

Considering the example shown in FIG. 3:

numMobilesPerSubframe=2*8/12=1.33.

In other words, the means for scheduling 14 is operable to determine an average number of mobile transceivers to be scheduled per transmission interval or sub-frame from a plurality of mobile transceivers. The average number of mobile transceivers is based on the delay and the transmission cycle capacity. The means for scheduling 14 is further operable to schedule multiple mobile transceivers in the sub-frames of the delay period. The delay period corresponds to the sequence of sub-frames having at least the duration of the delay. In the embodiment shown in FIG. 3 this corresponds to the 12 ms or 12 sub-frames. The means for scheduling 14 is operable to schedule the multiple mobile transceivers such that the average number of mobile transceivers is scheduled in the sub-frame of the delay is equal or lower than the average number of mobile transceivers to be scheduled per transmission interval. That is to say, after the average number of mobile transceivers to be scheduled per sub-frame has been determined, the scheduler may assure that said average number of mobile transceivers is met or fallen below for the delay period.

Figure 4:
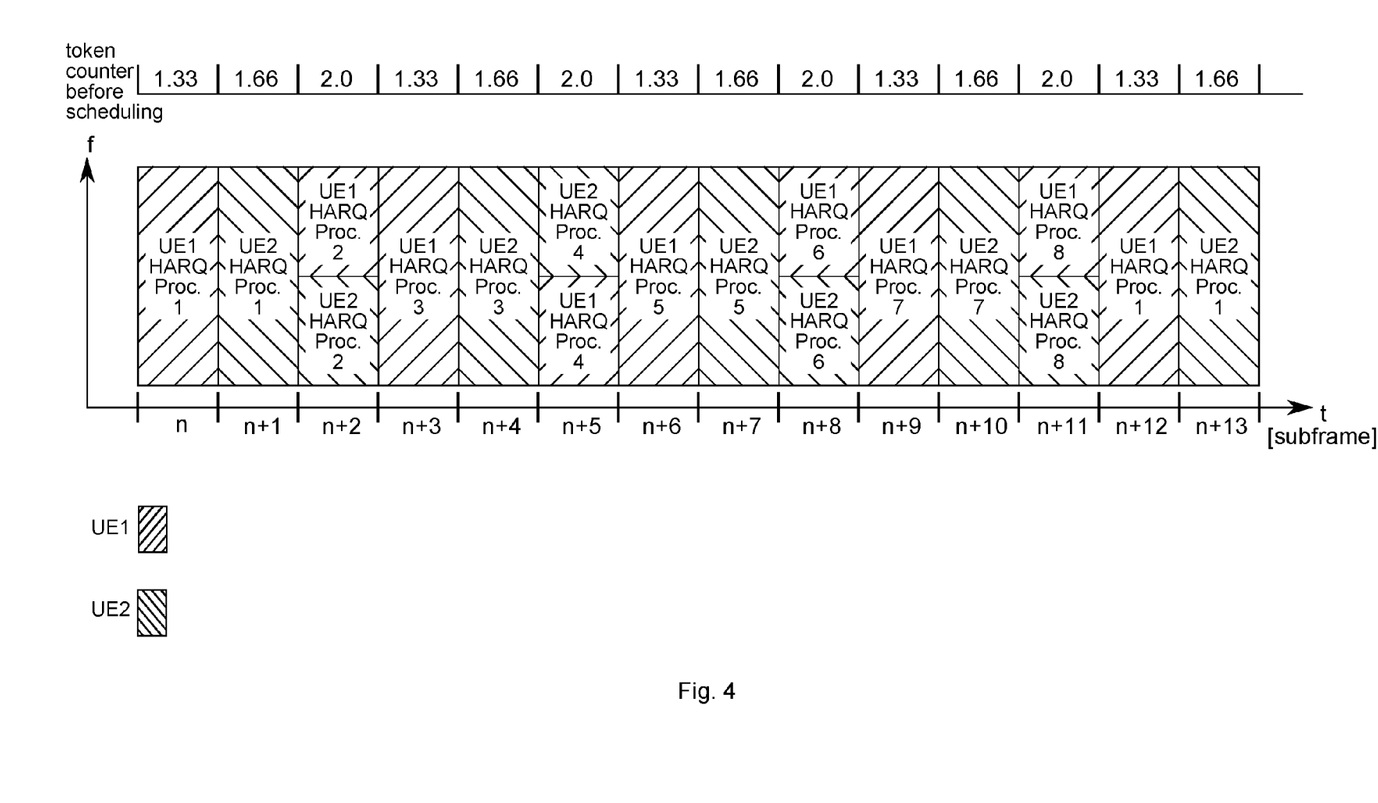
FIG. 4 shows a sequence of sub-frames illustrating data transmissions in an embodiment.

The means for scheduling 14 is operable to determine a counter per transmission interval or sub-frame. The counter is based on the delay period, the number of mobile transceivers to be scheduled, and the transmission cycle capacity in terms of transmission intervals of sub-frames. The means for scheduling 14 is operable to base the scheduling of the mobile transceivers on the counter. Based on the determined value for numMobilePerSubframe the maximum number of mobiles, which can be scheduled in a certain sub-frame or Time Transmission Interval (TTI), can be controlled. This can be easily realized by a token bucket. A token can correspond to one user, which might be scheduled in a certain sub-frame. The value of numMobilesPerSubframe may correspond to filling state of the token bucket per sub-frame and numMobilesPerSubframe+1 to the maximum token bucket size. Such an embodiment is illustrated in FIG. 4. FIG. 4 shows a sequence of sub-frames illustrating data transmissions in an embodiment. FIG. 4 shows the sequence of 14 subframes n to n+13 to the right and the frequency allocations to the top. In each sub-frame the mobile transceivers to which data transmission is scheduled in said sub-frame is shown. Above the sequence the token counter is illustrated before scheduling in the respective sub-frame. FIG. 4 shows the scheduling with the embodiment considering the example also used in FIG. 3. It can be seen that this scheme avoids on one side unused resources and still exploits frequency diversity as much as possible.

For example, the average number of mobiles to be scheduled per sub-frame is 1.33. In line with FIG. 4 during sub-frame n the token counter corresponds to 1.33. Single UE1 is scheduled during sub-frame n and the token counter is decreased by 1, leaving a residual of 0.33. During the next sub-frame, i.e. sub-frame n+1, the token counter is again increased by 1.33 resulting in 1.66. During the second sub-frame n+1 the second mobile transceiver UE2 is scheduled. Therefore for the next sub-frame n+2 the token counter is again decreased by 1 leaving a residual of 0.66 before being increased by 1.33 for sub-frame n+2. During this sub-frame n+2 the token counter therefore results to 2.0. The scheduler 14 now realizes that the token counter is growing, and since it is limited by 2.33, the two UEs UE1 and UE2 are both scheduled in the next sub-frame n+2. The token counter is now reduced by two leaving a residual of 0. When the token counter is again increased by 1.33 for the next sub-frame n+3, the token counter ends up at 1.33. In simple words, the scheduler ends up in a behavior, where during each third sub-frame both UEs are scheduled. In the given example the scheduler then ends up never exceeding the transmission capacity cycle of a UE and not generating empty transmission sub-frames.

Hence, the counter can be further based on a number of mobile transceivers having been scheduled in a previous transmission interval. In a further embodiment a counter can be further based on a number of mobile transceivers having been scheduled in the transmission interval delay period before the current transmission interval or sub-frame.

In such an embodiment, one process per sub-frame can be reserved such that in every sub-frame at least one mobile can be scheduled. The remaining number of HARQ processes may then be counted and can be used until the counter reaches 0. Again, coming back to the example of FIG. 3, there are numActiveMobiles*numHARQProcessesPerMobile=2*8=16

HARQ processes in total. HARQ RTT=12 HARQ processes are reserved, leaving numResidualHARQProcesses=4 HARQ processes that can be additionally used. The token counter can then be initialized to numResidualHARQProcesses. Before scheduling a sub-frame, the counter can be decremented by the number of mobiles in access to one scheduled in the last sub-frame and incremented by the number of HARQ ACK/NACKs received in the last sub-frame, i.e. the number of mobiles in access to one that have been scheduled in the sub-frame one HARQ RTT before.

In the embodiment an initialization can be achieved as follows:

counter(t=0)=numResidualHARQProcesses= numActiveMobiles*numHARQProcessesPerMobile−HARQ RTT numScheduledMobiles(t<1)=0

For all t>0:

$$counter(t) = \min(numResidualHARQProcesses,$$
$$counter(t-1) - \max(0, numScheduledMobiles(t-1)-1) +$$
$$\max(0, numScheduledMobiles(t-HARQ\ RTT)-1)$$
$$numScheduledMobiles(t) = \max(\min(numActiveMobiles, counter(t)+1),$$
$$\text{optimal number of mobiles according to } FDPFS).$$

Figure 5:
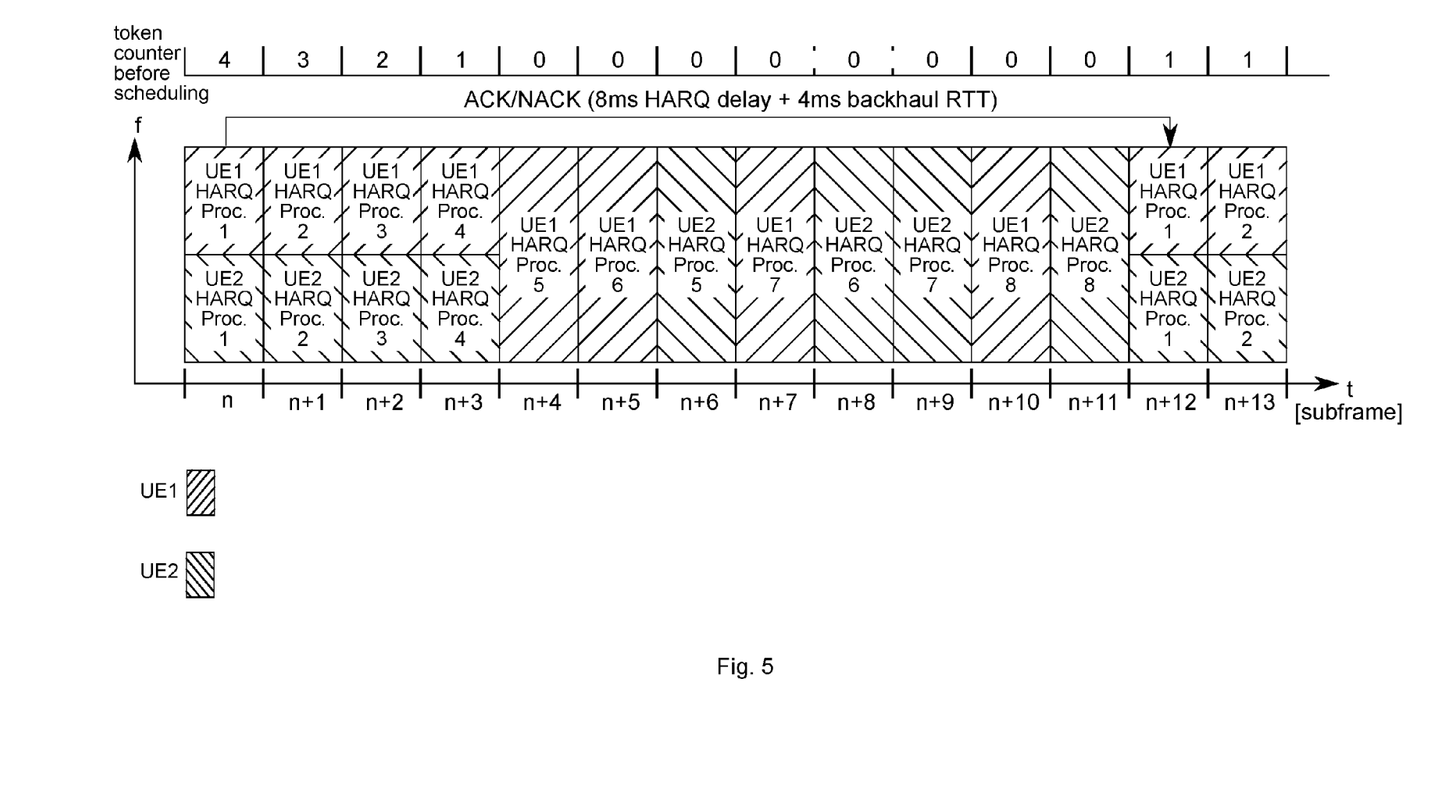
FIG. 5 shows a sequence of sub-frames illustrating data transmissions in an embodiment.

The resulting scheduling sequence is depicted in FIG. 5. FIG. 5 shows a sequence of sub-frames illustrating data transmissions in another embodiment. FIG. 5 shows the time scale to the right, which is again subdivided in 14 subsequent sub-frames n to n+13. Moreover, FIG. 5 shows the frequency resources to the top and a token counter according to the present embodiment on top of the transmission sequence. In line with the above equations it can be seen from FIG. 5 that the token counter starts at the initial value of the difference between the 12 sub-frames delay and the 2*8=16 HARQ process capacity of all mobiles. The counter is then reduced one by one according to the subsequent sub-frames. Once the counter reaches 0, only single mobiles are scheduled during the sub-frames until the counter can be increased after the delay period, i.e. the 12 sub-frames have been passed since the first sub-frame. In this example, the FDPFS always schedules the maximum possible number of mobiles according to the current counter value, i.e.

numScheduledMobiles (t)=min(numActiveMobiles, counter(t)+1).

As the above embodiments showed, empty sub-frames, i.e. sub-frames with no transmissions, can be avoided. This can be achieved by considering the individual transmission cycle capacities of the mobile transceivers and the respective delay introduced by the architecture of this system.

Figure 6:
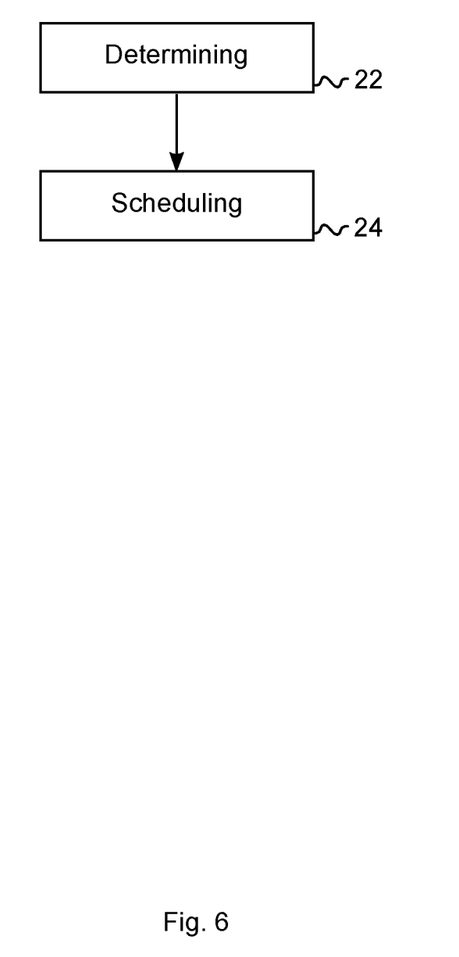
FIG. 6 shows a block diagram of an embodiment of a method for scheduling a data transmission.

FIG. 6 illustrates a block diagram of an embodiment of a method for scheduling a data transmission. The data transmission is scheduled to a mobile transceiver in a mobile communication system. The method comprises a first step of determining 22 a delay between a transmission of a first data packet and a transmission of a next data packet to the mobile transceiver, the delay depending on an acknowledgement packet received from the mobile transceiver for the first data packet. The effective HARQ loop delay may be determined. The method further comprises a second step of scheduling 24 data transmissions to a mobile transceiver based on the delay.

Further embodiments provide a computer program having a program code for performing one of the above methods when the computer program is executed on a computer or processor.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for determining", "means for scheduling", etc., may be provided through the use of dedicated hardware, such as "a determiner", "a scheduler", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processes, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for scheduling data transmissions to a mobile transceiver in a mobile communication system, the apparatus comprising:
   means for determining a delay between a transmission of a first data packet and a transmission of a next data packet to the mobile transceiver, the delay depending on an acknowledgement packet received from the mobile transceiver for the first data packet; and
   means for scheduling data transmissions to the mobile transceiver based on the delay, wherein the means for determining is operable to determine a transmission cycle capacity of the mobile transceiver, the transmission cycle capacity corresponding to a maximum number of data transmissions for which no acknowledgement packet has been received, and wherein the means for scheduling is operable to further base data transmissions to the mobile transceiver on the transmission cycle capacity of the mobile transceiver.

2. The apparatus of claim 1, wherein the data transmissions are organized in repetitive transmission intervals, and wherein the delay is determined in a number of transmission intervals.

3. The apparatus of claim 1, wherein the means for scheduling is operable to schedule data transmissions to a plurality of mobile transceivers and to further base the scheduling of data transmissions on a number of mobile transceivers being scheduled for data transmission.

4. The apparatus of claim 3, wherein the means for scheduling is operable to schedule data transmissions based on a scheduling metric, wherein the scheduling metric is determined per mobile transceiver to be scheduled, wherein the means for scheduling is operable to determine a mobile transceiver to be scheduled based on the scheduling metric until the transmission cycle capacity of the mobile transceiver is reached and wherein the means for scheduling is operable to determine a different mobile transceiver when the transmission cycle capacity of the mobile transceiver is reached.

5. The apparatus of claim 1, wherein the acknowledgment packet comprises a positive or a negative acknowledgement on a reception of the data packet at the mobile transceiver.

6. The apparatus of claim 1, wherein the means for scheduling is further operable to base data transmissions to the mobile transceiver on a proportional fair scheduling metric, the proportional fair scheduling metric taking into account a channel capacity of a radio channel between a transmission point of the data transmission and the mobile transceiver and the proportional fair scheduling metric taking into account an average data rate the mobile transceiver received during a time interval.

7. The apparatus of claim 1, wherein the means for scheduling is operable to schedule data transmissions to a plurality of mobile transceivers and to further base the scheduling of data transmissions on a number of mobile transceivers being scheduled for data transmission.

8. The apparatus of claim 1, wherein the means for scheduling is operable to determine an average number of mobile transceivers to be scheduled per transmission interval from a plurality of mobile transceivers, the average number of mobile transceivers being based on the delay and the transmission cycle capacity.

9. The apparatus of claim 8, wherein the means for scheduling is operable to schedule multiple mobile transceivers in the transmission intervals of a delay period, the delay period corresponding to a sequence of transmission intervals having at least the duration of the delay, such that an average number of mobile transceivers scheduled in a transmission interval of the delay is equal or lower than the average number of mobile transceivers to be scheduled per transmission interval.

10. The apparatus of claim 9, wherein the means for scheduling is operable to determine a counter per transmission interval, the counter being based on the delay period, the number of mobile transceivers to be scheduled, and the transmission cycle capacity in terms of transmission intervals, the means for scheduling being operable to base the scheduling of the mobile transceivers on the counter.

11. The apparatus of claim 10, wherein the counter is further based on a number of mobile transceivers having been scheduled in a previous transmission interval.

12. The apparatus of claim 10, wherein the counter is further based on a number of mobile transceivers having been scheduled in a transmission interval delay period before a current transmission interval.

13. A method for scheduling data transmissions to a mobile transceiver in a mobile communication system, the method comprising: determining a delay between a transmission of a first data packet and a transmission of a next data packet to the mobile transceiver, the delay depending on an acknowledgement packet received from the mobile transceiver for the first data packet; and scheduling data transmissions to the mobile transceiver based on the delay, wherein the determining comprises determining a transmission cycle capacity of the mobile transceiver, the transmission cycle capacity corresponding to a maximum number of data transmissions for which no acknowledgement packet has been received, and wherein the scheduling further comprises basing data transmissions to the mobile transceiver on the transmission cycle capacity of the mobile transceiver.

14. A non-transitory computer readable storage medium having a program code for performing the method of claim 13, when the computer program is executed on a computer or processor.

* * * * *